Dec. 1, 1931.　　V. R. DECROW　　1,834,092
LUBRICATOR
Filed Nov. 24, 1926　　2 Sheets-Sheet 1

Inventor
V. R. Decrow
By Popp & Powers
Attorneys

Dec. 1, 1931.  V. R. DECROW  1,834,092
LUBRICATOR
Filed Nov. 24, 1926   2 Sheets-Sheet 2
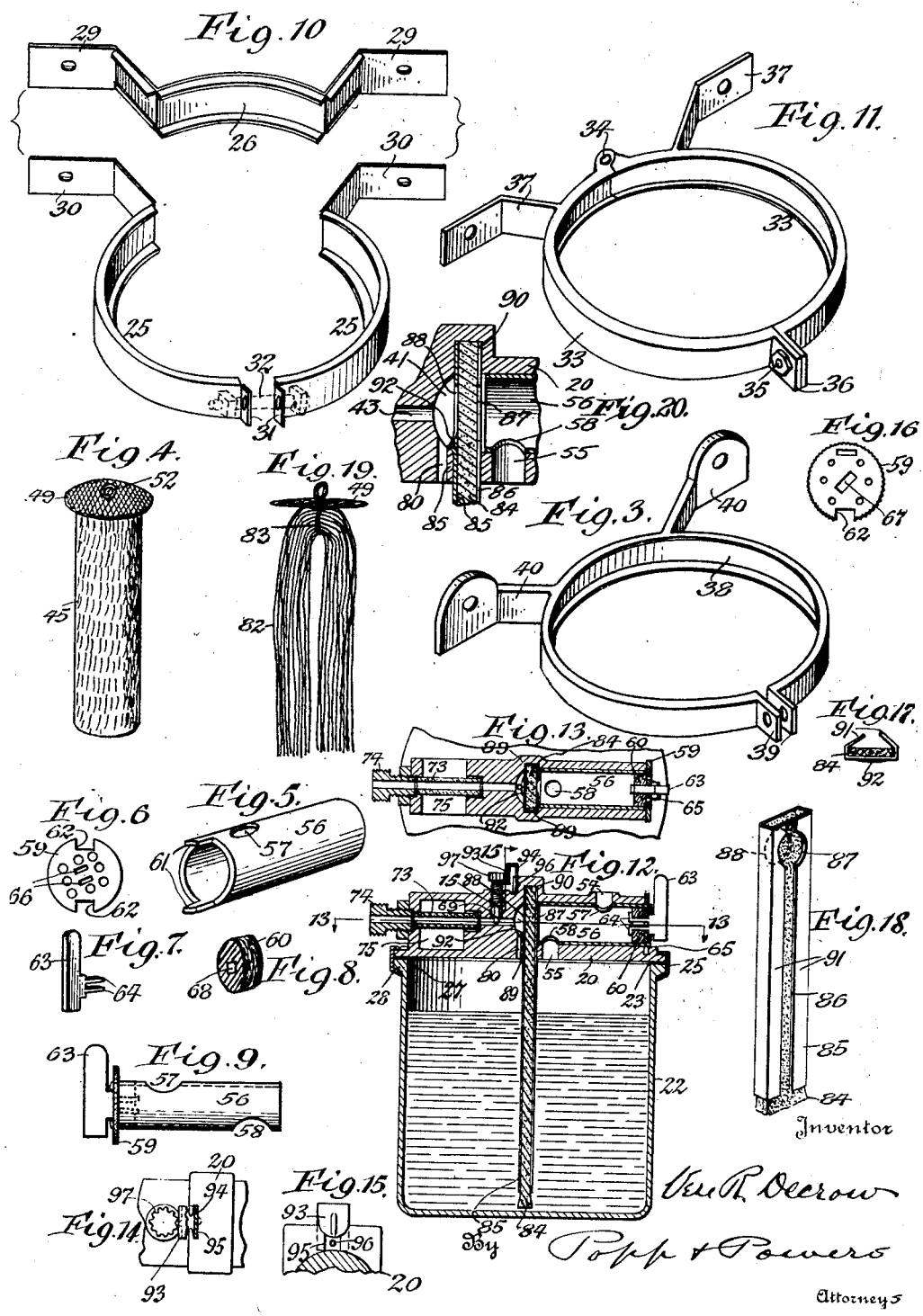

Patented Dec. 1, 1931

1,834,092

UNITED STATES PATENT OFFICE

VERE R. DECROW, OF LOCKPORT, NEW YORK

LUBRICATOR

Application filed November 24, 1926. Serial No. 150,595.

This invention relates to a lubricator for supplying a lubricant in the form of a liquid vapor to the combustion chamber of a gas engine through the fuel intake manifold, so that fuel and lubricant are drawn by vacuum into the firing space of the engine at the same time, and thereby lubricate the movement of the pistons in the cylinders, and the valves and valve stems.

It is the object of this invention to provide a lubricator of this character which is very simple and durable in construction, efficient and reliable in operation and capable of being readily installed on engines of various types but of standard construction.

Figure 3 is a perspective view of one form of supporting bracket and fastening, containing one feature of my invention.

Figure 4 is a perspective view showing the means for supporting the wick of the form shown in Fig. 2.

Figure 5 is a perspective view of the rotary valve which controls the filling of the lubricator with lubricating oil.

Figure 6 is a front elevation of the screen head or disk applied to the outer end of the lubricant valve, shown in Fig. 5.

Figure 7 is a perspective view of the handle which is employed in connection with the lubricant replenishing valve shown in Fig. 5.

Figure 8 is a similar view of the filter employed in connection with the lubricant replenishing valve.

Figure 9 is a side elevation of the lubricant replenishing valve together with the screen head and handle or thumb piece connected therewith.

Figure 10 is a perspective view of another form of supporting bracket and fastening which may be employed in connection with my invention for adjustably connecting the body and oil reservoir and also supporting the same on a stationary part of the engine.

Figure 11 is a similar view showing another form of such supporting bracket and fastening device which contains my improvement.

Figure 12 is a vertical section of a lubricator containing my invention and showing a form somewhat different in detail from that illustrated in Figs. 1 and 2.

Figure 13 is a horizontal section taken on line 13—13 Fig. 12.

Figure 14 is a fragmentary top plan view partly in section, of the lubricator shown in Figs. 12 and 13.

Figure 15 is a fragmentary vertical section taken on line 15—15, Fig. 12.

Figure 16 is a front view of a form of screen head similar to that shown in Fig. 6, but of slightly different construction.

Figure 17 is an end view of a form of wick and wick holder, somewhat different from that shown in Figs. 1, 2 and 4, and showing the parts in the position in which they are assembled, but not clamped together ready for use.

Figure 18 is a perspective view of the wick and wick holder shown in Fig. 17 in its completed form ready for use.

Figure 19 is a side view of another form of wick and wick holder which may be advantageously employed in the form of my lubricator illustrated in Figs. 1 and 2.

Figure 20 is a fragmentary vertical section, on an enlarged scale, showing the upper end of the wick tube, filling valve and top of the lubricator reservoir.

Similar characters of reference indicate like parts in the several figures of the drawings.

Figures 1, 2:
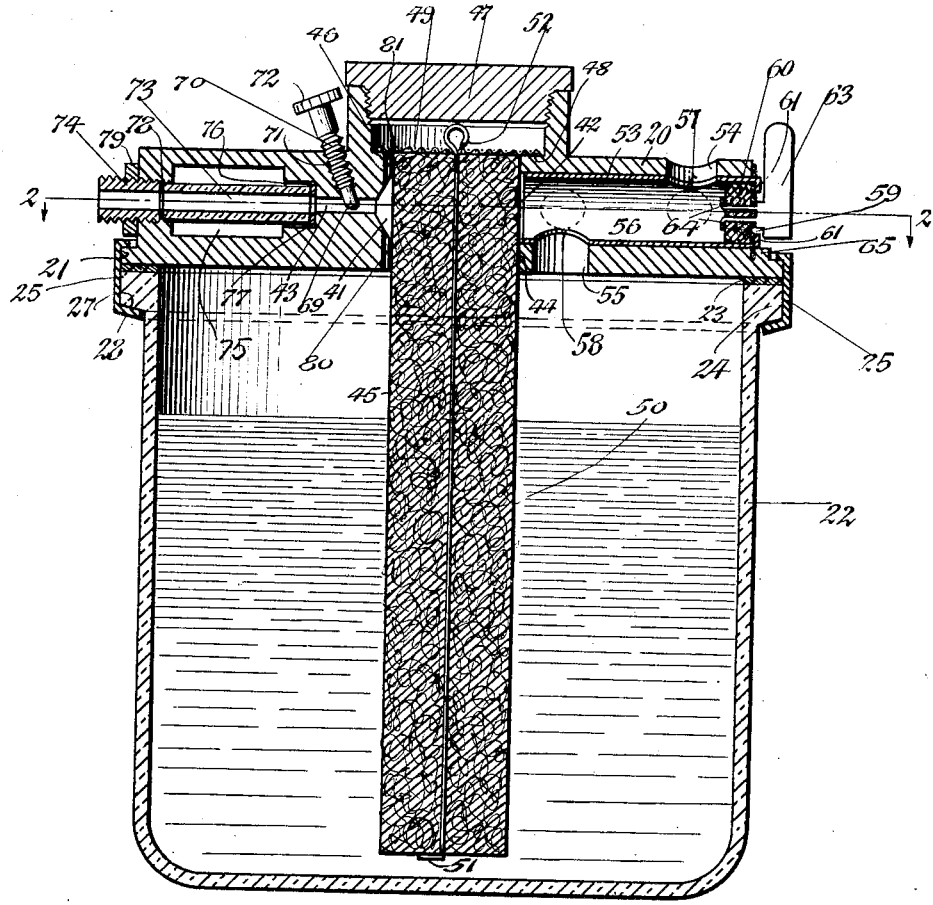
Figure 1 is a vertical section of a lubricator for accomplishing this purpose which embodies one form of my invention.
Figure 2 is a horizontal section taken on line 2—2, Fig. 1.

Referring to Figs. 1 and 2, the numeral 20 represents the upper section or body of the lubricator which contains one form of my invention, which body is preferably made of metal, although not necessarily so. This body has generally the shape of a disk which has its axis arranged vertically and the same is provided on the lower part of its periphery with an external annular flange 21. Below this body is arranged a reservoir or tank 22 which is adapted to contain a quantity of lubricant which is adapted by this instrument to be vaporized and delivered by the suction of the engine into the fuel intake of the engine for subsequently lubricating the pistons therein, at the same time that ignition of the power fuel occurs in the cylinders.

This reservoir is preferably constructed of glass or similar transparent material in the form of a cup, so that the attendant can readily observe when the supply of lubricant is running low and requires replenishing. This reservoir is preferably detachably connected to the under-side of the lubricator body so as to permit of readily cleaning the interior of the reservoir when this is necessary, and also rendering the under-side of the body accessible for purposes which will hereinafter appear.

In order to form a tight joint between this reservoir and the lubricator 20, a gasket or packing ring 23 is interposed between the upper end of the reservoir and the under side of the body 20, as shown in Figs. 1 and 12. On the upper part of the periphery of the tank 22 the same is provided with an external annular flange 24 which is preferably flush with the corresponding flange 21 on the body 20. The numerals 25 represent the two side sections of a clamping ring, and the numeral 26 the rear section of the clamping ring which is adapted to embrace the two flanges 21 and 24 of the body and reservoir, for which purpose these ring sections are made in the form of channel-shaped bands which have their concave sides facing inwardly and receive the flanges 21 and 24 of the body and reservoir. Upon drawing these several ring sections together they securely hold the body and reservoir together so as to form a leak-tight joint therebetween, which action is promoted by making the lower side of the flange 24 on the reservoir, inclined or beveled as shown in 27, and correspondingly inclining the lower flange 28 of each of the clamping ring sections, as best shown in Figs. 1 and 12. The rear clamping ring section 26 is provided at its opposite ends with laterally projecting supporting arms 29 which are adapted to be secured to the adjacent part of the engine cylinder or some other stationary part of the engine by means of bolts or other fastenings.

At the inner or rear ends of the side sections 25 of the clamping ring, the same are provided with laterally projecting arms 30 which are adapted to be secured to the arms 29 of the rear section 26 by the same bolts which fasten the arms 29 to the engine. On the front ends of the side section 25, the same are provided with forwardly projecting lugs 31 which are adapted to be connected by means of a bolt 32, which latter upon being tightened, draws the side sections 25 together and causes the opposing peripheral portions of the body 20 and the reservoir 22 to be tightly gripped by the clamping ring sections, and reliably held in place so that there will be no disturbance in the functioning of the lubricator when the same is in use on an automobile.

Upon loosening the bolt 32 slightly so that the grip of the ring sections 25 and 26 upon the body and reservoir is loosened, this body and reservoir may be rotated about a vertical axis as much as required, for bringing the parts of the body, particularly the conduits thereof into the desired position best suited for connecting the same with the other parts of the automobile with which this device is to be used. After such adjustment, the clamping bolt 32 may again be tightened for holding the parts in the proper position.

Instead of constructing the supporting and clamping bracket in three pieces as shown in Fig. 10, the same may be constructed in the form of a ring which has two sections 33, 33, the rear ends of which are pivotally connected by means of a hinge 34, while the front ends thereof are detachably connected by means of a bolt 35, connecting forwardly projecting lugs 36 on the front end of the sections 33, as shown in Fig. 11. In this case the two ring sections 33, 33 are provided with rearwardly projecting supporting arms 37 which may be connected by bolts or otherwise, with a stationary part of the engine, in a manner similar to that described with reference to the bracket construction shown in Fig. 10.

Another form of bracket is shown in Fig. 3 in which case the ring 38 is made in one continuous piece, but split at its front side so that the same can be sprung apart to permit of introducing flanges 21, 24 of the body and reservoir into the channel of this ring, after which this ring may be tightened upon the body and reservoir by means of bolts passing through forwardly projecting lugs 39, on the front ends of the split part of this ring. In this case, the rear part of the ring 38 is provided with rearwardly projecting supporting arms 40, similar to those shown in the construction illustrated in Fig. 11, for mounting the bracket on a stationary part of the engine. In both the constructions shown in Figs. 3 and 11, the body and reservoir of the lubricator are capable of being wholly detached from the bracket and also turned about a vertical axis in order to adapt the lubricator to any peculiar conditions which may be present when installing it on some particular automobile or gas engine.

Within the central part of the body 20, the same is provided with a vaporizing chamber 41 which has an air inlet 42 for external air on one side thereof, an outlet 43 for vaporized air on its diametrically opposite side, and a wick seat 44 extending from the top of this chamber downwardly along transverse opposite sides thereof, to the underside of the body 20. The numeral 45 represents an upright wick which may be constructed of any suitable fibrous material which produces a capillary action, such as felt and, which in the present instance has the form of an upright cylinder, the lower end of which projects downwardly into the reservoir so as to be immersed in the body of lubricating oil, contained therein, while the upper end thereof engages with the seat 44 of the vaporizing chamber so as to form a fibrous partition which extends across the entire vaporizing chamber, so that no air can pass through this vaporizing chamber from the inlet to the outlet thereof except that which passes through the fibrous wick.

In operation the capillary action of the wick raises the liquid lubricant from the reservoir into the upper part of the wick in the manner of a lamp wick, and the external air entering through the inlet 42 of the vaporizing chamber, passes through the oil-saturated end of the wick, so as to become laden with oil vapors, and this laden air is conducted in the form of a vapor from the outlet 43 of the vaporizing chamber to the intake of the gas engine, where the same mingles with the combustible fuel and is conveyed therewith to the firing space of the engine, where this lubricant operates to lubricate the contacting surface of the cylinder and piston while the explosive fuel operates to produce the power for moving the pistons.

This wick 45 may be supported on the body of the lubricator in any suitable manner, but this support is preferably so constructed that the wick can be removed in case it becomes clogged or worn out, and replaced by another. The means shown in Fig. 1 for thus supporting the wick 45 are constructed as follows:

Arranged in the upper part of the lubricator body is a renewing chamber 46 which communicates with the upper end of the vaporizing chamber 41 through the medium of the wick seat 44, while its upper end is closed by means of removable screw plug 47. This wick renewing chamber is somewhat larger in diameter than the opening in its bottom whereby it communicates with the vaporizing chamber, so as to form an upwardly facing shoulder 48 around the wick seat 44. To the upper end of the wick 45 is secured a disk 49 consisting preferably of a circular piece of wire fabric which is of larger diameter than the wick 45, so that the marginal part of this screen 49 overhangs the sides of the wick and engages with the shoulder 48, thereby forming a stop as well as a support for the wick, which limits the downward movement of the latter in the seat 44 and into the lubricant reservoir.

This screen 49 may be connected with the wick in various ways, for example by means of a coupling wire 50 extending vertically through the center of the wick and the central part of the screen 49, and provided at its lower end with a laterally turned lug 51 which engages with the lower end of the wick, while its upper end is provided with an eye 52 engaging with the upper side of this screen. By this means the screen may be removed from the reservoir and body by pulling upwardly on the eye 52 after the plug 47 has been removed, and a new wick similarly equipped may be substituted by a reversal of this operation.

Means are provided for replenishing the oil supply in the reservoir from time to time, which means are preferably combined with a filtering device whereby the air which is drawn from the exterior atmosphere through the wick and delivered to the intake of the gas engine, due to the vacuum created in the engine cylinder while the engine is in operation. The construction of the means for thus supplying the reservoir with oil, and the means for filtering the air supplied to the wick, shown in Figs. 1 and 2, are constructed as follows:

The numeral 53 represents a cylindrical oil replenishing valve seat extending horizontally from the inlet 42 of the vaporizing chamber to one side of the lubricator body and provided near the outer end of its upper part with an upwardly opening inlet port 54 and near the inner end of its underside with an outlet port 55, which opens into the upper part of the reservoir. Rotatable within the cylindrical seat 53 is a tubular valve 56 which communicates at its inner end with the air inlet 42 of the vaporizing chamber, while its outer end is provided with a filtering device through which air is adapted to pass from the exterior of the lubricator through the valve 56 into the vaporizing chamber. Adjacent to one side of its outer part, the valve 56 is provided with a laterally opening inlet port 57 and on the diametrically opposite side, but adjacent to the opposite end of this valve, the same is provided with an outlet port 58. The relative arrangement of the ports 54, 55 of the lubricator body and of the ports 57, 58 in the replenishing valve 56, is such that this valve may be turned so that its port 57 registers with the body port 54 and its outlet port 58 registers with the body port 55 at the same time, as shown in Fig. 1, thereby causing oil which is poured into the port 54 to be conducted through the port 57, tubular valve 56, port 55, and body port 58 to the interior of the reservoir.

When sufficient oil has been introduced into the reservoir, the valve 56 is turned so that its ports 57 and 58 are out of register with the ports 54 and 55 of the body, whereby communication between the interior of the valve and the external atmosphere and the interior of the reservoir are cut off, as shown by dotted lines in Fig. 1, and no further oil can be introduced into the reservoir.

The filtering device which is mounted on the outer end of the replenishing valve 56 may be variously constructed, but in the present case the same consists of a screen 59 of perforated sheet metal secured to the outer end of the valve 56, and a filtering plug or wad 60 of fibrous material such as felt arranged within the outer part of the valve 56 in engagement with the inner side of the screen 59, as shown in Fig. 1. The screen 59 is preferably of a larger diameter than the valve 56, and bears with its marginal edge portion against the adjacent external surface of the lubricator body 20, and the same is secured to the outer end of the valve 56 by means of two lugs 61 arranged on the diametrically opposite edge portions of the valve 56, and passing outwardly through notches 62 in the edge of the screen 59 and bent or crimped against the outer side of this screen as shown best in Figs. 1, 9 and 12, thereby reliably connecting the valve 56 and the screen 59 in a simple and efficient manner.

The filtering plug 60 is preferably secured to the screen 59 by means which also serve to turn the valve 56 into and out of its operative position. As shown in Figs. 1, 2, 6, 7, 9, 12 and 13, the means for this purpose consist of a handle 63 engaging with the outer side of the screen 59 and provided with two spurs or lugs 64 which pass inwardly through corresponding openings in the screen 59 and filtering plug 60, and are clinched or upset against the inner side of this plug, thereby reliably holding the handle on the valve 56 and also retaining the screen 59 and filter plug 60 in engagement with each other.

By reason of the engagement of the lug 61 with the notches 62 in the screen 59, the latter is compelled to turn with the valve 56 upon manipulating the handle 63.

In order to prevent the valve 56 from being withdrawn from its seat 53 when in its operative position, a stop lug 65 is provided on the exterior of the body 20 so as to engage with the lower part of the outer side of the screen 59, when the valve 56 is in its closed position. When it is desired to remove the valve 56 from its seat 53, this valve may be turned so that one of its notches 62 registers with the stop lug 65 and then the respective notch 62 which is of greater width than the stop lug 65 will permit the outward passage of the screen 59 over the lug 65 and the withdrawal of the valve 56 from its seat. In like manner this valve may again be reassembled with the body of the lubricator by the reversal of this operation.

In Fig. 6 the screen 59 is provided with two openings 66 for the passage of the lugs or prongs 64, but if desired, this disk as shown in Fig. 16, may be provided with a single opening 67 for the passage of both prongs of the handle 63, and as shown in Figs. 8, 12, the filter plug 60 may also be provided with a single opening 68 for the passage of both prongs 64 of the handle 63.

During the operation of the lubricator, the valve 56 is turned so as to close the oil replenishing ports 54 and 55 and at this time the external air passes through the filter screen 59 and the filter plug 60, thereby separating any dust from the air before it reaches the upper part of the oil-laden wick, thereby preventing the wick from becoming clogged with dust and insuring its operation for vaporizing the air with oil for a considerable time before the wick becomes clogged with dirt and requires either cleaning or renewal in order to restore the lubricator to its maximum efficiency.

In order to regulate the amount of oil vapor laden air which passes through the outlet 43 from the vaporizing chamber 41 to the gas engine, a regulating valve is provided which as shown in Fig. 1, may consist of a needle valve 69 which is adapted to move across the outlet 43 so as to obstruct this passage more or less, for which purpose this needle valve is provided with an external screw thread 70 engaging with an internally threaded opening 71 in the valve body, and a finger piece 72 at its outer end, whereby the same may be turned for adjusting the position of the needle valve, and the capacity of the outlet 43.

In order to enable the operator to determine whether the lubricator is in working condition, a sight passage is provided as a part of the conduit through which the vaporized air is conducted after leaving the vaporizing chamber, and before reaching the intake of the gas engine. This sight passage is preferably formed in a sight tube 73 of transparent glass, which communicates at its inner end with the outlet 43 of the vaporizing chamber, while its outer end communicates with a coupling nipple 74 leading to the conduit whereby the vaporized air is delivered to the intake of the engine. In the construction shown in Fig. 1, this sight tube has its central part intermediate of the ends thereof exposed through a sight opening 75 formed in the upper part of the lubricator body, while the inner end of this sight glass is arranged within a pocket 76 on the lubricator body and bears against a packing ring 77 arranged at the bottom of the pocket 76 and around the passage 43, while the outer end of the tube 73 bears against the inner end of the coupling nipple 74 through the middle of a packing ring 78. Loosening of the coupling nipple 74 is prevented by a lock nut 79 applied to this nipple and engaging the outer side of the valve body, as shown in Fig. 1.

In order to prevent any air from being trapped in the upper part of the oil reservoir which otherwise might interfere with the filling of the same with oil or the withdrawal of the oil therefrom by the pulling action of the vacuum in the engine, a vent opening 80 is provided in the body which extends from the lower side of the vaporizing chamber into the upper part of the oil reservoir, as shown in Figs. 1 and 2. To facilitate the rise of oil in the wick, an upward suction through the same is produced which together with the capillary action of its fibers serve to raise the oil therein to the upper part of the same which extends across the path of the air as the latter passes from the inlet 42 to the outlet 43 of the vaporizing chamber. For this purpose a suction passage 81 is provided in the body 20 which extends from the vaporizing chamber on the outlet side thereof to the renewing chamber 46, as shown in Fig. 1. It follows from this that the vacuum which is produced in the vaporizing chamber due to the suction of the engine, will also cause a vacuum in the wick renewing chamber 46 and thereby produce an upward suction on the wick which will expedite the rising action of the oil therein and aid capillary attraction so that ample oil will always be present in the upper part of the wick, and furnish an adequate amount of oil in finely divided form, which is taken up by the air passing through the wick to be later on carried to the engine for lubricating purposes.

Instead of constructing the wick of tubular form as shown at 45 in Figs. 1 and 2, this wick may be constructed of a plurality of strands 82 which are doubled upon themselves, and connected at the turn by means of a band or tie 83 with each other and with the screen 49, as shown in Fig. 19.

A wick of this form can be passed downwardly through the wick seat 44 so that the lower end of these strands are immersed in the liquid lubricant while the screen 49 rests upon the shoulder 42 and retains the upper part of the wick across the central part of the vaporizing chamber 41 so that it will obstruct the path of the air and compel the same to pass through the upper part of the wick and remove the oil particles therefrom for use in lubricating the engine.

Another form of wick is shown in Figs. 12, 13, 17 and 18, in which case the wick 84 is made flat in a manner similar to a lamp wick and the same is held in place so that its lower part is immersed in the lubricating oil within the reservoir while its upper end is extended across the path of the air in the vaporizing chamber. The holding of the wick in this position is effected in this case by means of a tubular holder 85 which is preferably made of sheet metal and of rectangular form in cross section, so as to fit the cross sectional shape of the wick which is enclosed thereby. One of the flat sides of this wick holder is provided with a longitudinal slot 86 and both of the flat sides of this holder are provided at their upper ends with openings 87, 88 which are in line with each other so as to expose a considerable portion of the upper end of the wick which is arranged within the vaporizing chamber, and on a horizontal line with the inlet and outlet of this chamber, so that the air entering through the inlet is compelled to pass through the wick and pick up the oil therein before it can escape as oil-laden air through the outlet of the vaporizing chamber, and serve to lubricate the engine to which this oil laden air is delivered. The wick holder 85 in this instance engages its opposite vertical edges with seats 89 formed on transversely opposite sides of the vaporizing chamber and the upper end of the holder engages with a socket 90 formed in the top of the vaporizing chamber as shown in Fig. 12. The wick 84 is preferably placed within the holder 85 while the flanges 91 on opposite sides of its slot 86 are widely separated, as shown in Fig. 17, after which these flanges are pressed inwardly so as to fit close against the wick, as shown in Figs. 13 and 18, thereby retaining the wick and holder against displacement relative to each other.

In order to prevent the wick holder from becoming displaced in the body of the lubricator when the latter is in use a lug or spur 92 is preferably formed at the lower edge of one of the side openings of the wick holder, which is adapted to engage with the adjacent part of the bottom of the vaporizing chamber, as shown in Figs. 12 and 13, and thereby arrest the downward movement of the wick holder on the lubricator body. For the purpose of enabling this spur 92 to clear the guide-way when assembling the parts, this spur is made on the solid side wall of the holder so as to enable the spur to be deflected inwardly by pressure, together with the intervening part of the wick so that this spur can clear the wick seat 89, and when the wick holder has been raised a sufficient extent in the body, the expansion of this holder will project the spur 92 over the adjacent part of the bottom of the vaporizing chamber and thereby hold the parts in the proper relative position.

For the purpose of removing the wick holder from the lubricator body, the flat walls of the holder are first pressed inwardly and the adjacent part of the wick is compressed sufficiently to disengage the spur 92 from the bottom of the vaporizing chamber, after which the wick holder together with the wick, can be readily withdrawn and replaced by a new one. In the preferred construction, the slotted side of the wick holder is arranged on the inner side of the vaporizing chamber, as shown in Figs. 12 and 13.

With the form of the invention shown in Figs. 12–19 and 20 it has been found that it is of prime importance in securing a uniform feed of oil, that is, a sufficient feed at high engine speeds when the manifold pressure depression or vacuum is small and the velocity high and a non-excessive feed at low engine speeds when this manifold vacuum is great and the velocity low, that the proper relative pressures be maintained in the vaporizing chamber 41 and the interior of the valve 56 on the inlet side of the wick. It is also important to maintain a proper relative pressure between the vaporizing chamber 41 and the oil reservoir 22. The maintenance of these proper relative pressures in the valve 56, reservoir 22 and vaporizing chamber 41 is effected by the restricted opening 80 which connects the vaporizing chamber 41 and the reservoir 22 and by the slot 86 in the wick holder 85, this slot 86 forming a restricted passage between the reservoir 22 and the interior of the valve 56. These passages 80 and 86 essentially form a restricted air by-pass around the wick 84 and the restriction of this by-pass is determined by the size of the passage 80. The provision of this by-pass formed by the passages 80, 86 around the wick, tends to balance or equalize the pressure on opposite sides of the wick and also balance the velocity of the air on opposite sides of the wick. By so by-passing a part of the air around the wick and maintaining balanced or uniform pressures and velocities on opposite sides thereof, the feed of oil from the wick is substantially constant regardless of variations in the velocity and vacuum in the intake manifold and therefore uniformly feeds a constant quantity of oil at all engine speeds. Without the provision of this restricted by-pass formed by the passages 80, 86 the feeding of oil would be substantially proportional to the manifold vacuum so that there would be an excess of oil at low engine speeds when the manifold vacuum is great and insufficient oil fed at high engine speeds.

By by-passing the air through the reservoir 22, a balance is obtained between the vapor chamber 41 and the reservoir 22, and this prevents oil from being sucked up the wick and insures that the flow of oil up this wick is due solely to capillary action. Since the movement of the oil up the wick through capillary action is constant it follows that by balancing the pressures on the outlet side of the wick and in the reservoir 22 through the provision of the restricted passage 80, the supplying of oil to the upper end of the wick will be constant at all times and that this balancing of pressures further tends to effect a uniform feed of oil at all engine speeds.

It has also been found that the size of the passage 80 determines the amount of oil fed since the size of this passage regulates the effective size of the by-pass around the wick and hence the amount of oil fed.

In Fig. 1, the needle valve 69 is arranged on an incline and is retained in position solely by the frictional engagement of its screw thread with that of the lubricator body. If desired, however, this valve may be arranged vertically, and a detent device may be provided as shown in Figs. 12, 14 and 15, for the purpose of preventing accidental displacement of the needle valve and a disturbance in the regulation or flow of the lubricant-laden air to the engine. The detent device which is preferably employed for this purpose consists of a U-shaped strip of spring metal, one leg of which forms a jaw 93 which is adapted to engage with the knurled finger piece 97 of the needle valve, while the other leg 94 is pushed downwardly into an undercut or T-shaped seat 95, formed on the upper central part of the lubricator body, as shown in Figs. 12, 14 and 15. The leg 94 is preferably interlocked with the vaporizer body by means of a punch mark 96 which enters the adjacent part of the body, as shown in Figs. 12 and 15, and thereby reliably connects these parts and prevents the same from becoming disengaged during the vibration of the automobile on which the lubricator is mounted.

Although the detent 93, upon engaging the head 97 of the needle valve, operates to hold the same against turning while the lubricator is in use, it is nevertheless possible to overcome the resistance of this detent by finger pressure in order to turn the needle valve one way or the other when it is desired to change the position of the same to suit different conditions.

As a whole, this lubricator comprises comparatively few parts, which are of simple construction, which are capable of being produced and assembled at low cost. The lubricator in its completed form is very efficient in operation and not liable to get out of order, and the same can also be very readily taken apart and re-assembled when required for inspection, cleaning or repairing.

I claim:

1. A lubricator of the character described, comprising a body having a vapor chamber which is provided with an air inlet and a vapor outlet and through which air is adapted to pass from said inlet to said outlet, an oil supply reservoir, a wick having one part arranged in said oil reservoir so as to become saturated with oil while another part of the wick is arranged across the path of the air in said vapor chamber and the air is compelled to pass through the wick and become charged with vaporized oil, and a bracket for detachably connecting said body and reservoir and supporting the same.

2. A lubricator of the character described, comprising a body having a vapor chamber provided with an inlet and a vapor outlet, and an external flange, an oil reservoir arranged below said body and provided with an external flange, and means for connecting said body and reservoir comprising a channel-shaped clamping ring adapted to receive the flanges of said body and reservoir, and supporting arms projecting laterally from said ring.

3. A lubricator of the character described, comprising a body having a vapor chamber provided with an air inlet and a vapor outlet and an upright seat extending across said chamber, an oil reservoir arranged below the body, a wick having one end arranged in said reservoir, and its other end arranged in said chamber, and a holder for said wick engaging said seat, said holder being provided with openings to permit the passage of air through said wick and with a longitudinal slot on one of its sides which intersects the respective opening therein.

4. A lubricator of the character described, comprising a body having a vapor chamber provided with an air inlet and a vapor outlet and an upright seat extending across said chamber, an oil reservoir arranged below the body, a wick having one end arranged in said reservoir and its other end arranged in said chamber, and a holder for said wick engaging said seat, said holder being provided with openings to permit the passage of air through said wick and with a lip at the lower edge of one of said openings which is adapted to engage the adjacent lower part of said chamber.

5. A lubricator of the character described, comprising a body provided with a vapor chamber having an air inlet and a vapor outlet, a circular valve seat leading to said chamber, and upper and lower oil ports arranged in the upper and lower parts of the body, at opposite ends of said seat, an oil reservoir arranged below the body, a wick arranged in said reservoir and in said chamber, and a hollow rotary valve arranged in said seat and having ports on opposite sides and ends thereof adapted to register with the ports of said body.

6. A lubricator of the character described, comprising a body provided with a vapor chamber having an air inlet and a vapor outlet, a circular valve seat leading to said chamber, and upper and lower oil ports arranged in the upper and lower parts of the body at opposite ends of said seat, an oil reservoir arranged below the body, a wick arranged in said reservoir and in said chamber, a hollow rotary valve arranged in said seat and having ports on opposite sides and ends thereof adapted to register with the ports of said body, and a screen arranged at the outer end of said valve.

7. A lubricator of the character described, comprising a body provided with a vapor chamber having an air inlet and a vapor outlet, a circular valve seat leading to said chamber, and upper and lower oil ports arranged in the upper and lower parts of the body at opposite ends of said seat, an oil reservoir arranged below the body, a wick arranged in said reservoir and in said chamber, a hollow rotary valve arranged in said seat and having ports on opposite sides and ends thereof adapted to register with the ports of said body, said hollow rotary valve forming an air passage communicating with said vapor chamber, and means for intercepting dust arranged at the outer end of said valve.

8. A lubricator of the character described, comprising a body provided with a vapor chamber having an air inlet and a vapor outlet and an undercut slot in its top, and oil reservoir arranged below the body, a wick arranged in the reservoir and in said chamber, a needle valve having a screw connection with said body and adapted to control said vapor outlet and having a finger piece, and a spring detent having one end arranged in said undercut slot and its opposite end engaging with said finger piece.

9. A lubricator of the character described, comprising a body provided with a vapor chamber having an air inlet and a vapor outlet and an undercut slot in its top, an oil reservoir arranged below the body, a wick arranged in the reservoir and in said chamber, a needle valve having a screw connection with said body and adapted to control said vapor outlet and having a finger piece, and a spring detent having one end arranged in said undercut slot and its opposite end engaging with said finger piece, and a punch mark on said detent engaging with said body.

10. A lubricator of the character described, comprising a body having a vapor chamber which is provided with an air inlet and a vapor outlet and through which air is adapted to pass from said inlet to said outlet, an oil supply reservoir and a relatively compact wick having one part arranged in said oil reservoir so as to become saturated with oil while another part of the wick is arranged across the path of the air in said vapor chamber and the air is compelled to pass through the wick and become charged with vaporized oil, said body being provided with a vent leading from the oil reservoir to the outlet side of the vapor chamber, whereby substantially uniform relative pressures are maintained in said oil reservoir and the outlet side of said vapor chamber.

11. A lubricator of the character described, comprising a body having a vapor chamber which is provided with a gas inlet and a vapor outlet and through which gas is adapted to pass from said inlet to said outlet, a substantially unobstructed liquid supply reservoir arranged adjacent said chamber, means actuated through the velocity of the air passing through said chamber for charging said air with liquid drawn from said reservoir, and a restricted by-pass for by-passing a part of the air from said inlet to said outlet through said reservoir and around said liquid charging means whereby a substantially uniform velocity of air passing said oil charging means is maintained at all pressures at said outlet.

12. A device of the character described, including a body forming a chamber having a gas inlet and an outlet, a liquid supply reservoir arranged adjacent said chamber, a relatively compact wick having one part arranged in said reservoir so as to become saturated with liquid while another part of said wick is arranged across said chamber and through which gas passing through said chamber is compelled to pass and means providing a restricted by-pass from said inlet to said outlet around said wick and through said reservoir and whereby substantially balanced pressures are maintained on opposite sides of said wick and in said reservoir.

13. A lubricator of the character described, comprising a body having a vapor chamber provided with an air inlet and a vapor outlet and an upright seat extending across said chamber, an oil reservoir arranged below the body, a wick having one end arranged in said reservoir and its other end arranged in said chamber, and a holder for said wick engaging said seat, and comprising a tube which receives said wick and is provided with openings on its opposite sides which are in line with said chamber.

In testimony whereof I, hereby affix my signature.

VERE R. DECROW.